United States Patent
Peteresen et al.

(10) Patent No.: US 7,981,039 B2
(45) Date of Patent: Jul. 19, 2011

(54) RECEIVE CIRCUIT FOR MINIMIZING CHANNELS IN ULTRASOUND IMAGING

(75) Inventors: David A. Peteresen, Fall City, WA (US); Steven R. Martin, North Bend, WA (US); Michael T. Reynolds, Bothell, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 323 days.

(21) Appl. No.: 12/241,313

(22) Filed: Sep. 30, 2008

(65) Prior Publication Data

US 2009/0093720 A1 Apr. 9, 2009

Related U.S. Application Data

(62) Division of application No. 10/788,021, filed on Feb. 26, 2004, now Pat. No. 7,691,063.

(51) Int. Cl.
*A61B 8/00* (2006.01)

(52) U.S. Cl. ........ 600/447; 600/437; 600/443; 600/450; 600/459

(58) Field of Classification Search .......... 600/437, 600/443, 447, 450, 459
See application file for complete search history.

(56) References Cited

U.S. PATENT DOCUMENTS

| | | | |
|---|---|---|---|
| 4,116,229 A | 9/1978 | Pering | |
| 5,520,187 A | 5/1996 | Snyder | |
| 5,573,001 A | 11/1996 | Petrofsky | |
| 5,617,862 A | 4/1997 | Cole et al. | |
| 5,676,147 A * | 10/1997 | Petrofsky et al. | 600/447 |
| 6,013,032 A | 1/2000 | Savord | |
| 6,126,602 A * | 10/2000 | Savord et al. | 600/447 |
| 6,497,663 B2 | 12/2002 | Fraser et al. | |
| 6,530,887 B1 | 3/2003 | Gilbert et al. | |
| 6,669,633 B2 | 12/2003 | Brodsky et al. | |
| 6,752,763 B2 | 6/2004 | Erikson | |
| 6,821,251 B2 | 11/2004 | Alexandru | |
| 6,869,401 B2 | 3/2005 | Gilbert et al. | |
| 6,969,352 B2 | 11/2005 | Chiang et al. | |
| 7,075,369 B2 * | 7/2006 | Takenaka | 330/254 |
| 7,691,063 B2 * | 4/2010 | Peteresen et al. | 600/447 |
| 2005/0148873 A1 | 7/2005 | Petersen et al. | |
| 2005/0148878 A1 | 7/2005 | Phelps et al. | |
| 2005/0203392 A1 | 9/2005 | Petersen et al. | |
| 2009/0105587 A1 * | 4/2009 | Petersen et al. | 600/437 |

OTHER PUBLICATIONS

U.S. Appl. No. 12/240,844, filed Sep. 29, 2008, Petersen et al.
U.S. Appl. No. 12/240,886, filed Sep. 29, 2008, Petersen et al.

* cited by examiner

*Primary Examiner* — Tse Chen
*Assistant Examiner* — Baisakhi Roy

(57) ABSTRACT

Receive circuits and associated methods are provided for ultrasound imaging. Both subarray mixing and time division multiplexing are provided with a same circuit. Components of the receive circuit respond to either phasing or time slot information to implement subarray mixing or time division multiplexing. A network of switches allows combination of signals from different elements to form different sub-apertures. A controller minimizes power consumption while outputting the desired phase or time division multiplexed information by gating a clock to various registers. Each of the registers corresponds to different groups of transducer elements. For loading new phasing information, the clock is turned on to the desired register. Duration operation of the receive circuit, the clock is gated off. The register outputs the previously loaded values in a static state without clocking. Preamplification for either of time division or subarray mixed signals is provided using a variable gain amplifier with a common mode feedback. The common mode feedback provides for a constant operating point despite changes in the desired amount of gain.

19 Claims, 7 Drawing Sheets

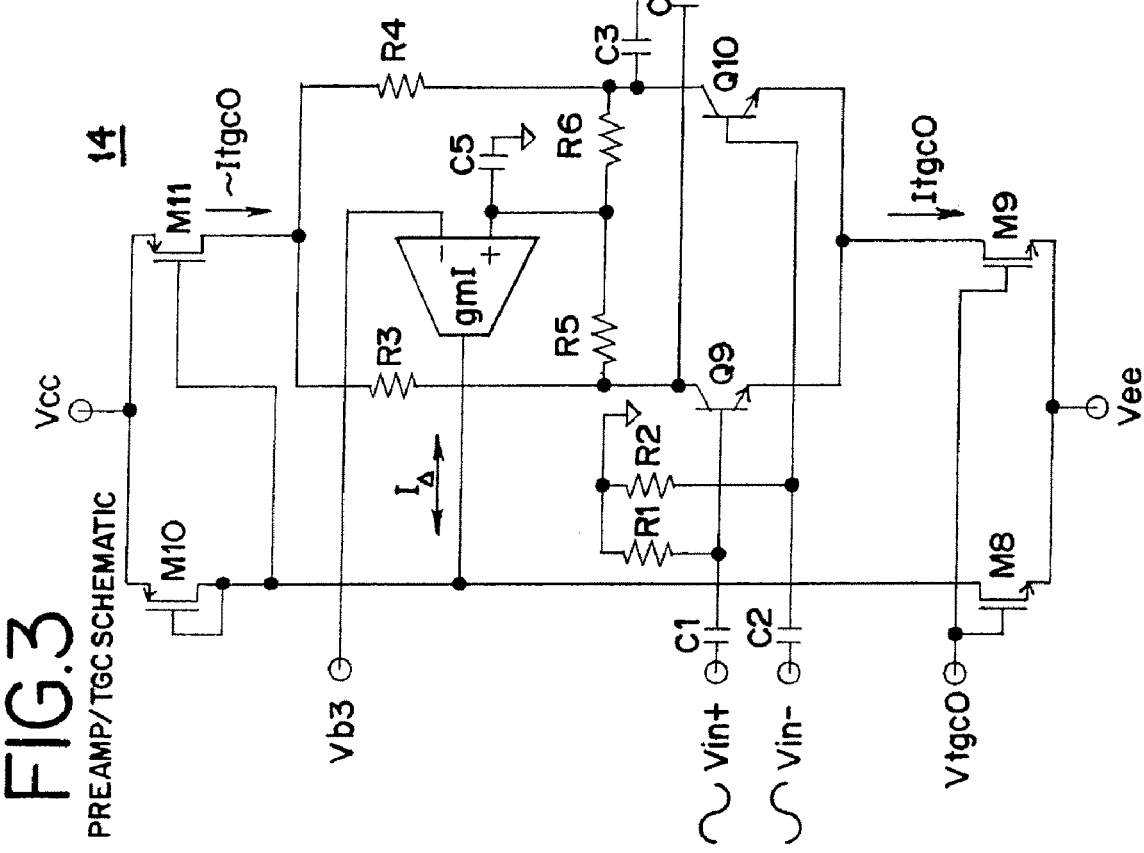
FIG.4 BLENDER SCHEMATIC
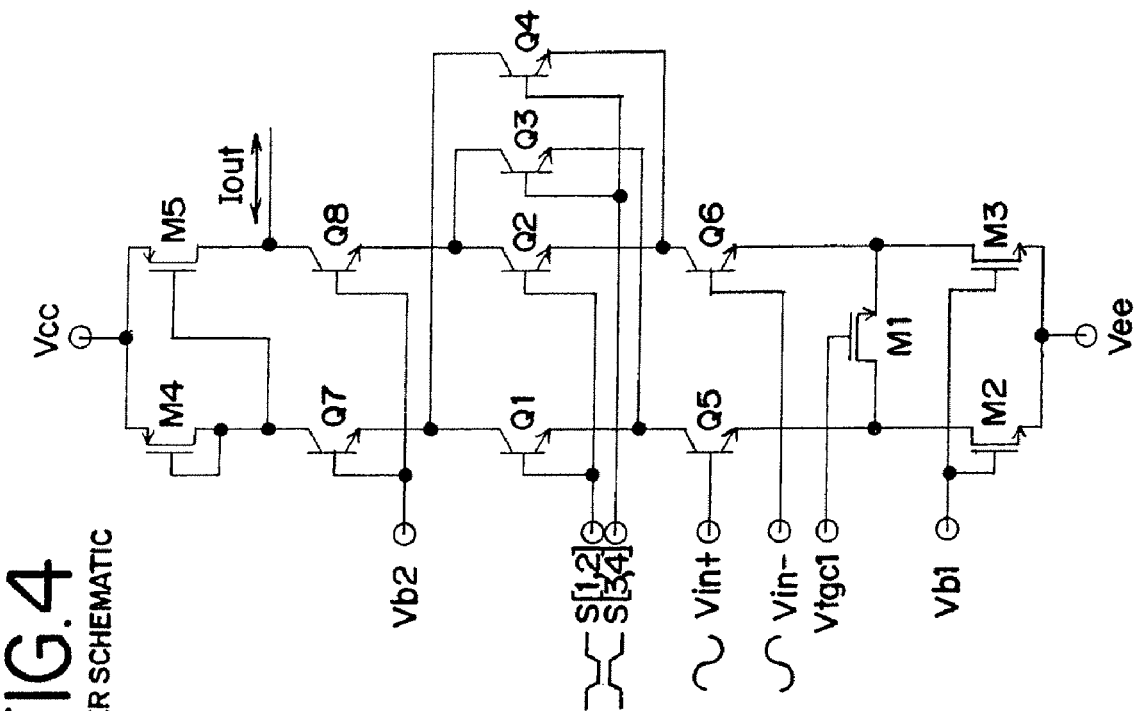
FIG.3 PREAMP/TGC SCHEMATIC

RECEIVE CIRCUIT FOR MINIMIZING CHANNELS IN ULTRASOUND IMAGING

RELATED APPLICATIONS

The present patent document is a divisional of U.S. Pat. No. 7,691,063 (Ser. No. 10/788,021), filed Feb. 26, 2004, which is hereby incorporated by reference.

BACKGROUND

The present invention relates to receive circuits and associated methods for minimizing channels in ultrasound imaging systems. In particular, circuits, controllers and methods for combining signals from multiple elements onto a same path are provided.

Medical diagnostic ultrasound imaging systems have a limited number of receive beamformer channels. The size of coaxial cables connecting transducer elements to the imaging system and associated receive beamformer channels may also limit the number of usable elements of a transducer array. To maximize the number of elements used, signals from a plurality of elements may be multiplexed onto a same cable. U.S. Pat. No. 5,573,001, the disclosure of which is incorporated herein by reference, discloses partial beamforming to combine signals from multiple elements for processing by a single receive beamformer channel. Signals from different elements are mixed with signals having selected phases, and the mixed signals are then summed together to form a partially beamformed sub-array signal. The subarray signal is responsive to each of the plurality of elements and may be processed with a single receive beamformer channel. Subarray mixing across an array allows the use of more elements than receive beamformer channels. Subarray mixing or partial beamforming may be desired in some situations and undesired in others. Multiplexing may be desired in some situations, but undesired in others. For example, multiplexing may not reduce the number of receive beamformer channels needed as compared to the number of elements.

The mismatch between the number of transducer elements and the number of receive beamformer channels or cables may occur in three-dimensional imaging systems using multi-dimensional arrays of transducer elements. Where the number of cables or receive beamformer channels is limited, circuitry may be provided within a transducer assembly for performing multiplexing or sub-array mixing. For example, U.S. Patent Nos. 2005-0148878 A1 and 2005-148873 A1, the disclosures of which are incorporated herein by reference, disclose detachable transducer probe assemblies providing one of multiplexing or subarray mixing.

BRIEF SUMMARY

By way of introduction, the preferred embodiments described below include receive circuits and associated methods for ultrasound imaging. Both subarray mixing and time division multiplexing are provided with a same circuit. Different aspects of the circuit and method are provided. First, components of the receive circuit respond to either phasing or time slot information to implement subarray mixing or time division multiplexing. Second, a network of switches allows combination of signals from different elements to form different subapertures. Third, a controller minimizes power consumption while outputting the desired phase or time division multiplexed information by gating a clock to various registers. Each of the registers corresponds to different groups of transducer elements. For loading new phasing information, the clock is turned on to the desired register and off to the receive circuitry. During operation of the receive circuit, the clock is gated off to the desired register and gated on to the receive circuitry. The register outputs the previously loaded values in a static state without clocking. Fourth, preamplification for either of time division or subarray mixed signals is provided using a variable gain amplifier with a common mode feedback. The common mode feedback provides for a constant operating point despite changes in the desired amount of gain.

The present invention is defined by the following claims, and nothing in this section should be taken as a limitation on those claims. The various aspects described above may be used individually or in any possible combination. Other aspects and advantages are discussed below in conjunction with the preferred embodiments. These further aspects and advantages may be used independently of any of the aspects described above.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3 is a circuit diagram of one embodiment of a preamplifier;

FIG. 4 is a circuit diagram of one embodiment of a portion of the circuit of FIG. 2;

DETAILED DESCRIPTION OF THE DRAWINGS AND PRESENTLY PREFERRED EMBODIMENTS

Subarray mixing and time division multiplexing are performed using a same receive circuit. Subarray mixing and time division multiplexing are two methods for conveying ultrasound receive signals from a large number of elements over a smaller number of channels or to a system with a smaller number of beamforming channels. Other partial beamforming, multiplexing or other methods for reducing the number of paths, cables or receive beamformed channels needed may be used as an alternative or in addition to subarray mixing and time division multiplexing.

The receive circuit is used for two-dimensional or three-dimensional imaging. For example, a multi-dimensional array is provided for real time three-dimensional imaging using either subarray mixing or time division multiplexing. Subarray mixing and time division multiplexing both use switches and summation to combine signals from a plurality of receive elements onto a same output. By taking advantage of the similarity, a flexible receive circuit configuration allows operation in either mode with a minimum of extraneous circuitry. An output switching matrix connected prior to the summation provides scalable circuitry that may be used in a variety of sub-array or system configurations, maximizing the adaptability of the subarray mixing, multiplexing or other method of conveying a large number of signals on a fewer number of processing channels or cables.

Figure 1A:
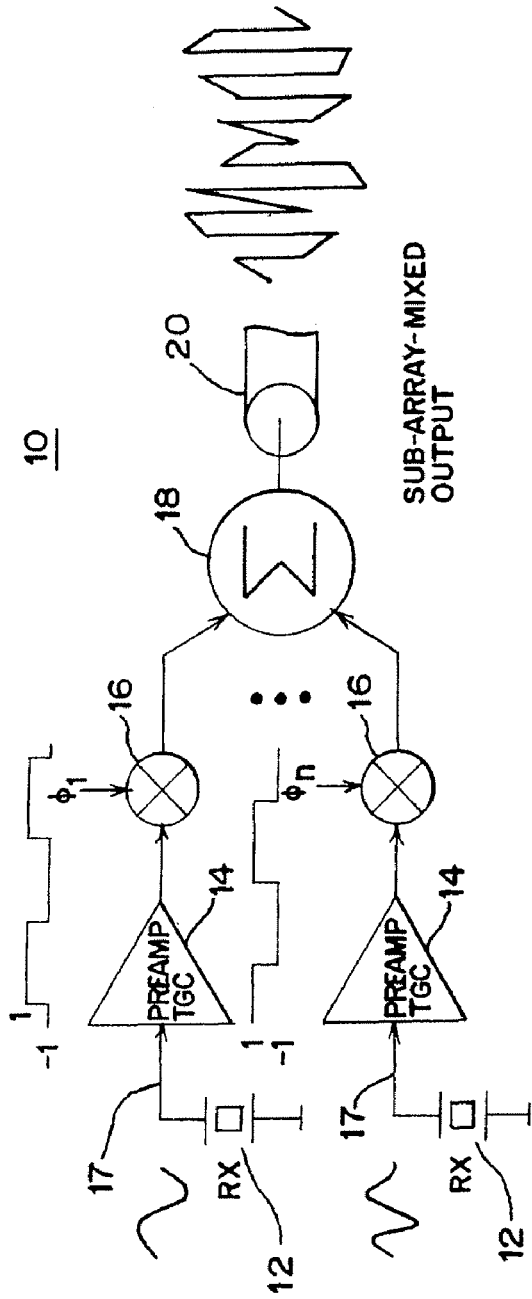
FIGS. 1A and 1B show one embodiment of a same receive circuit being used for subarray mixing and time division multiplexing, respectively.
Figure 1B:
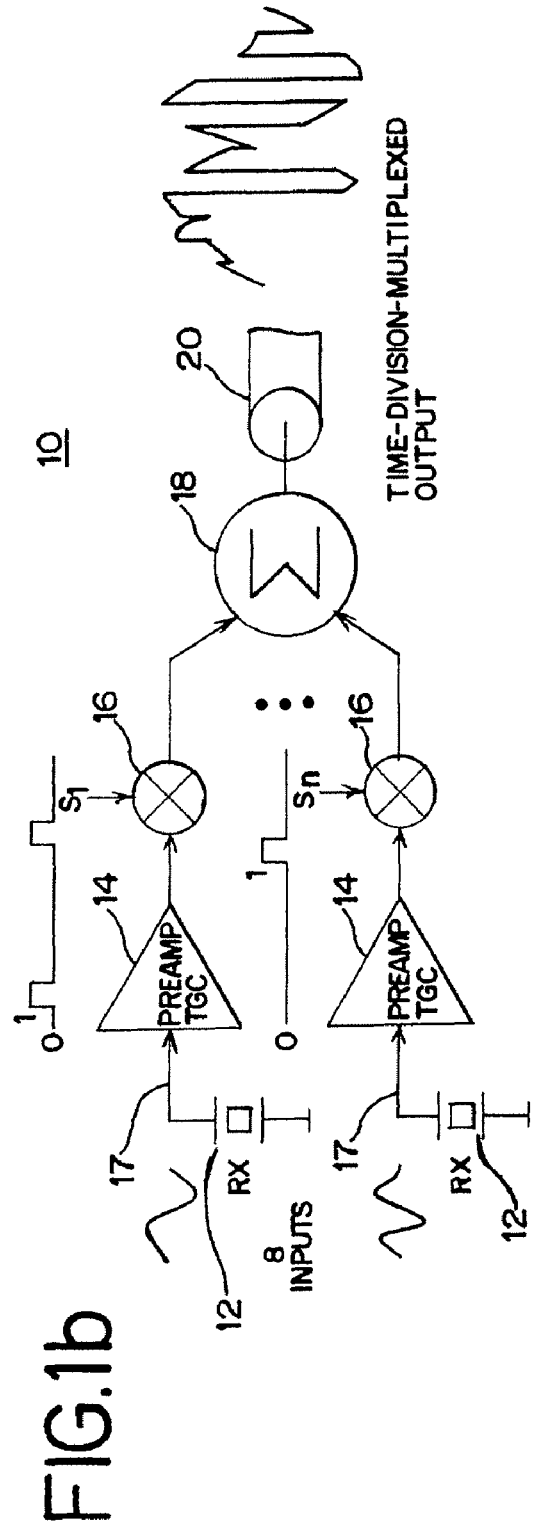

FIGS. 1A and 1B show a receive circuit 10 for ultrasound imaging. FIG. 1A shows the receive circuit used for subarray mixing, and FIG. 1B shows the receive circuit 10 used for time division multiplexing. The receive circuit 10 includes a plurality of elements 12, a receive path 17 with a preamplifier 14 and a component 16, a summer 18 and a cable 20. Additional, different or fewer components may be provided, such as additional summers 18, the path 17 without the preamplifier 14 or the receive circuit 10 without the cable 20.

For both subarray mixing and time division multiplexing, the receive signals from the elements 12 are multiplied by the component 16. For example, the component 16 is a switch or other multiplier for implementing a switching pattern prior to summation. For sub-array mixing, the switching pattern for each path 17 is a phase shifted plus and minus "1" square wave, such as shown in FIG. 1A for two paths 17. These phase shifted waveforms overlap in time so that the summation combines signals from individual elements with relative phasing. By choosing a desired multiplier phase, a steered partial receive beam is formed for the summed subarray. The use of a minus "1" or inverted multiplication suppresses harmonic mixing terms. As shown in FIG. 1B, the switch pattern used for time division multiplexing is a sequence of "0" and "1" values. An inversion or minus "1" value may not be used, or may be used instead of the one value. As shown in FIG. 1B, the time slot signal for each path 17 is non-overlapping with the other paths 17. A time slot corresponds to the duration of the "1" signal. Using non-overlapping patterns, signals from different elements 12 may not coincide, allowing the multiplexing and recovery. Time division multiplexed signals may allow for more flexible beamforming but use switches that settle faster than otherwise required for subarray mixing due to the relatively short time slot period used in time division multiplexing.

The plurality of elements 12 is piezoelectric or CMUT arrays of elements. In one embodiment, the plurality of elements are distributed in a fully sampled multi-dimensional grid as a multi-dimensional transducer array. One-dimensional, sparse sampling or other grid spacings of elements may be provided. Any now known or later developed array of elements may be used. In one embodiment, the arrays of elements 12 are positioned within a detachable transducer assembly. In one embodiment, the elements 12 are housed in a hand-held transducer housing. Alternatively, a catheter or endoscope configuration is used.

Figure 2:
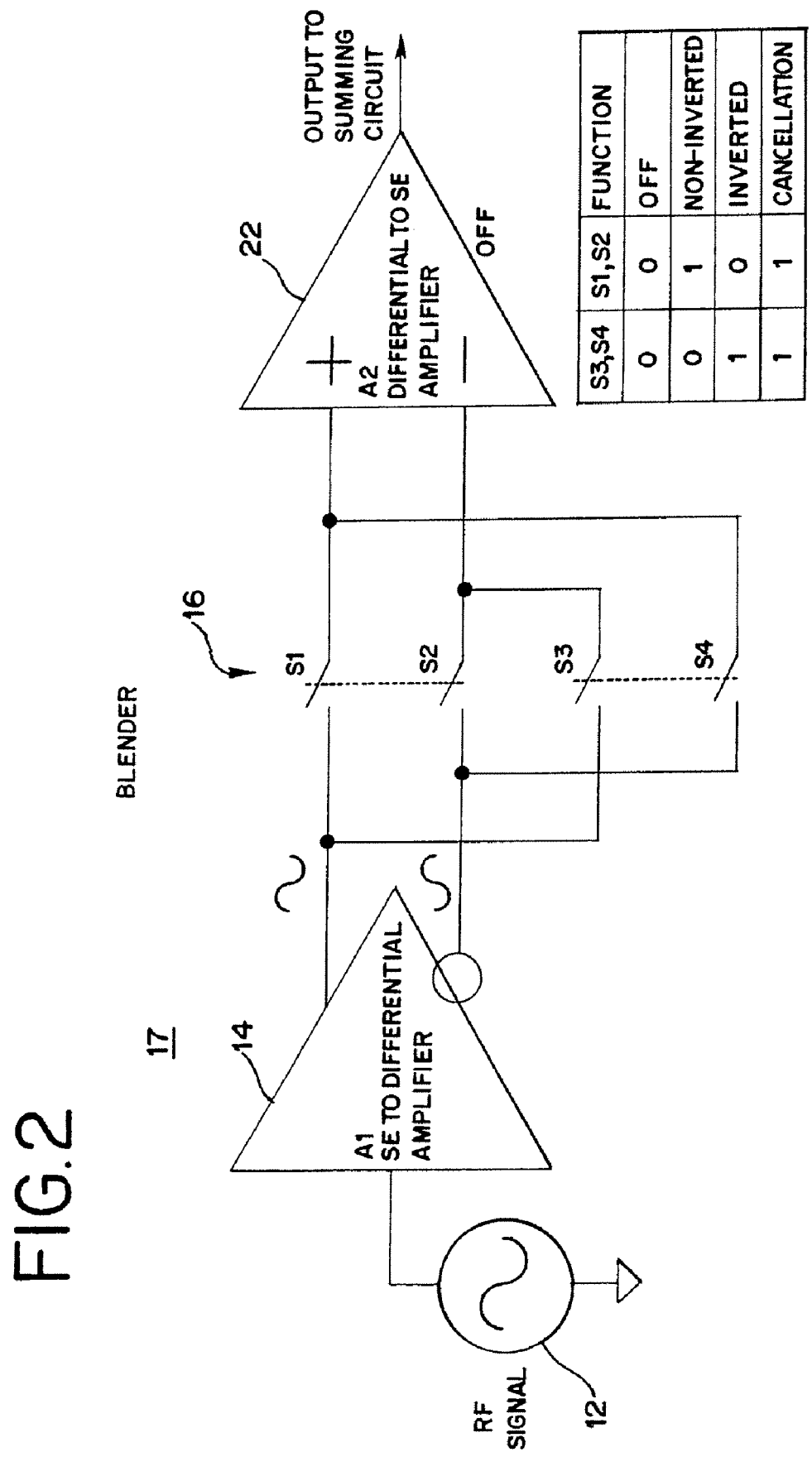
FIG. 2 is a circuit diagram of one embodiment of a receive path with a common component for implementing both subarray mixing and time division multiplexing.

FIG. 2 shows one embodiment of one path 17 of FIGS. 1A and 1B. The path 17 connects to the transducer element 12, and includes the preamplifier 14, the component 16 and an output amplifier 22. Additional, different or fewer components may be provided. One path 17 is provided for each of the respective plurality of transducer elements. Alternatively, a path 17 is provided for each element 12 of a subset of the total number of elements.

The preamplifier 14 is a single ended input amplifier having differential outputs connected with the component 16 in one embodiment. In alternative embodiments, differential inputs and/or a single output is provided. The preamplifier 14 includes a plurality of transistors, resistors or other now known or later developed devices for implementing an amplifier. In one embodiment, the preamplifier 14 has a variable gain, such as allowing selection of one or a range of gains for one mode of processing (e.g., time division multiplexing) and a different gain or range of gains for a different mode of processing (e.g., subarray mixing). The preamplifier 14 has a variable gain, such as for providing a higher gain for time division multiplexing to allow the output signal to use a full dynamic range, and a lesser gain for sub-array mixing where the signals are summed with non-zero values from other elements 12.

FIG. 3 shows one embodiment of the preamplifier 14. The amplifier 14 is shown as a single ended input amplifier with a variable gain and a common mode feedback. For a single ended input, the Vn− is grounded. For a differential input, the signals are provided to the Vn+ and − connections. Receive signals from the element 12 are coupled to the amplifier through the capacitor C1 and the resistor R1. The capacitor C1 and R1 and C3, C4, R5 and R6 are selected to pass desired ultrasound frequencies while rejecting low frequency transients. The emitter coupled pair Q9 and Q10 form a bipolar differential amplifier. The emitter coupled transistor pair Q9 and Q10 provide a current gain, but voltage gain may be provided in alternative embodiments. The resistors R3 and R4 act to convert the current gain provided by Q9 and Q10 to a voltage output and low-pass filter in conjunction with C3 and C4.

The current or voltage gain is varied in response to an adjustable bias current provided by the Vtgco input through the transistor M9. The transistor M9 acts as current source connected with the bipolar differential amplifier. The current source provides a variable gain in response to the input voltage Vtgc0.

To hold the operating point constant, a common mode feedback path is provided to the current source M9 from the bipolar differential amplifier Q9, Q10. The common mode feedback path includes the transconductor gm1. The transconductor gm1 generates a current in response to a difference in the voltages of a reference voltage Vb3 and the voltage output by the bipolar amplifier between resistors R5 and R6. The common mode feedback path also includes mirrored transistor pairs M8, M9 and M10, M11. The transistor M8 mirrors the bias current in the transistor M9, and the mirrored transistors M10, M11 invert and mirror the bias current. The mirror transistors are balanced or made as similar as possible by device matching. Resistors R5, R6 and capacitor C5 in conjunction with the transconductor gm1 low pass averages the output of the amplifier and generates a current correction for holding the operating point constant despite any changes in gain. The operating point for the constant voltage is input by Vb3. The current mirrors M10 and M11 act to source the same current at the top or output of the amplifier as is sunk by M9 due to gain control.

In one embodiment, the preamplifier 14 provides a variable gain for implementing the different types of processing, such as subarray mixing and multiplexing. In alternative or additional embodiments, the preamplifier 14 includes a gain adjustment for depth gain control. Signals associated with deeper penetration of ultrasound within tissue have a greater gain applied to compensate for attenuation. While one embodiment of the preamplifier 14 is shown above in FIG. 3, modifications may be provided, such as providing different resistor, capacitive or transistor structures. For example, the transistors M1, M2, M3, Q5 and Q6 shown in FIG. 4 are also included as part of the preamplifier.

Referring again to FIG. 2, the path includes a component 16 that operates differently for each of at least two different sub-aperture modes. Sub-aperture modes include time division multiplexing of a plurality of elements onto a single output, subarray mixing of signals from a plurality of elements onto a same output, partial beamforming, other types of multiplexing or any other now known or later developed process for placing signals from a plurality of elements onto a fewer number of outputs. For example, the component 16 is operable to mix an input signal with a local oscillator signal in a subarray mixing mode and is also operable to output the input signal in a selected time slot in a time division multiplexing mode.

In one embodiment, the component 16 is a mode responsive switch connected between the preamplifier 14 and one of a differential amplifier 22, a summer, or switching network for connecting the path 17 to different summers. Opening and closing the switch modulates the input signal or selects a time slot for multiplexing to output the input signal. The control signal operating the switch implements the modulation or time slot selection. In the embodiment shown in FIG. 2, the component 16 includes a plurality of switches, such as four switches S1 through S4. Switches S1 and S3 connect with one of the differential outputs from the preamplifier 14, and switches S2 and S4 connect with a different one of the outputs from the preamplifier 14. The output of the switches S1 and S4 connect together, and the outputs of the switches S2 and S3 connect together. For example, the output of the switches S1 and S4 connect to a positive input of the differential output amplifier 22, and the output of the switches S2 and S3 connect together to a minus input of the differential output amplifier 22. Other connections using fewer or additional switches may be provided. For example, additional switches are provided for implementing three or more different sub-aperture modes.

Different combinations of switches are operable for different sub-aperture modes. For example, the switches S1 and S2 are ganged together or operable in unison in response to a same control signal. Similarly, switches S3 and S4 are ganged together or operable in unison in response to a same control signal. The four state table shown in FIG. 2 shows one example of controlling the switch pairs to implement time division multiplexing and sub-array mixing with the same switches. Subarray mixing is implemented by alternating between inverted and non-inverted states shown in the table. The timing of switching between the inverted and non-inverted states establishes the phase and local oscillation frequency. For example, FIG. 1A shows the one minus one or inverted and non-inverted states of the component 16 and relative phasings for two paths 17. Sub-array mixing is provided by opening the third and fourth switches while closing the first and second switches and vice versa for inversion and non-inversion. Time division multiplexing is implemented by alternating between the non-inverted and off states. The non-inverted state is implemented for identifying a time slot, the off-state is associated with time slots used by other paths 17. For example, FIG. 1B shows two different time slots for two different paths 17 indicated by switching between the non-inverted one state and the off zero state. Time division multiplexing corresponds between opening the third and fourth switches while closing the first and second switches and closing the first, second, third and fourth switches for the off-state.

For a voltage mode implementation, the cancellation state where S1, S2, S3, and S4 are on at a same time is not used. Instead, switches S1, S2, S3, and S4 are opened and some impedance is introduced across the input terminals of amplifier 22 to provide an off state. Alternatively, current mode circuits are used. FIG. 4 shows one embodiment of a BiCMOS implementation of the component 16, a portion of the preamplifier 14 and the differential output amplifier 22. The transistors Q5 and Q6 form a differential voltage-to-current amplifier with a transistor M1 controlling the transconductance via the gain signal Vtgc1. The transistors M2 and M3 provide constant current sources. The transistors M1, M2, M3, Q5 and Q6 are a second stage of the preamplifier described above with respect to FIG. 3. The Vout + and Vout − of FIG. 3 connect with the Vin + and Vin − of FIG. 4. The Vtgc1 signal provides an additional variable-gain control via transistor M1. The Vb1 signal is used to set the DC bias current in Q5 and Q6 via the transistors M2 and M3, respectively. The signal can be used to adjust the circuit for different operating conditions and is responsive to a selection of preset static levels via bits in the global control register.

The collector currents of the transistors Q5 and Q6 are differential and routed to the switching matrix Q1, Q2, Q3 and Q4. The switching matrix Q1 through Q4 corresponds to the switches S1 through S4 of component 16 discussed above for FIG. 2. The control signals s1, s2, s3 and s4 control each of the transistors Q1 through Q4, respectively. The transistors Q1 through Q4 and signals s1 through s4 form a current-mode implementation of component 16 in FIG. 2. With this circuit, the cancellation state is used to implement time-division multiplexing. In alternative embodiments, voltage-mode switches are used and the off state is used for time-division multiplexing.

The differential-to-single ended output amplifier 22 is implemented with the transistors Q7, Q8, M4 and M5. Other implementations may be used, such as by using M4 and M5 without Q7 and Q8. The transistors Q7 and Q8 form a cascode stage which improves the speed of the switching network, increasing the bandwidth but using more power. The transistors M4 and M5 form a differential-to-single ended current output stage. The output current Iout is the output of the path 17 and is responsive to the mode of operation of the switches Q1 through Q4. For example, Iout represents an input signal mixed with the local oscillating frequency at a selected phase. As another example, Iout represents an input signal during a desired time or time slot and otherwise has a zero output value.

Bias current is reused throughout the various stages to save power. The current sources M2 and M3 provide current biasing of the amplifiers Q5 and Q6. This bias current is reused in the switching matrix Q1 through Q4, the optional cascode stage Q7 and Q8 and the output stage M4 and M5.

Referring to FIGS. 1A and 1B, a summer 18 combines the signals from a plurality of paths 17. The summer 18 comprises a connection of signal traces in one embodiment, but active summers may be provided in other embodiments. In one embodiment, the summer comprises an operational amplifier. One input of the amplifier is grounded and the other input of the amplifier connects to a plurality of paths 17. The operational amplifier converts the current output by each path to a combined voltage signal. The virtual ground summation node of the operational amplifier provides isolation between the channels or path 17 and avoids problems with parasitic capacity loading at the summation node, so a large number of paths may be summed without limiting the circuit bandwidth. The path 17 of each sub-aperture connects to a same summer 18. For example, a plurality of summers is provided. Each summer connects with a different group of paths 17 and associated elements 12. Each different group of elements 12 and paths 17 corresponds to a sub-aperture. The output of each of the summers 18 is an output sub-aperture signal. In the sub-array mixing embodiment, the output sub-aperture signal represents partial beamformation of the sub-aperture. For the time division multiplex mode of operation, the output sub-aperture signal represents time division multiplexing of the signals from the various elements within the sub-aperture.

In one embodiment, the circuitry of FIGS. 3 and 4 with or without control circuits are implemented as an application specific integrated circuit. A path 17 is provided for each of the elements. In alternative embodiments, each of the path 17, portions of the path 17 or one ore more components are implemented as separate devices or as a circuit on different semiconductors.

Figure 5:
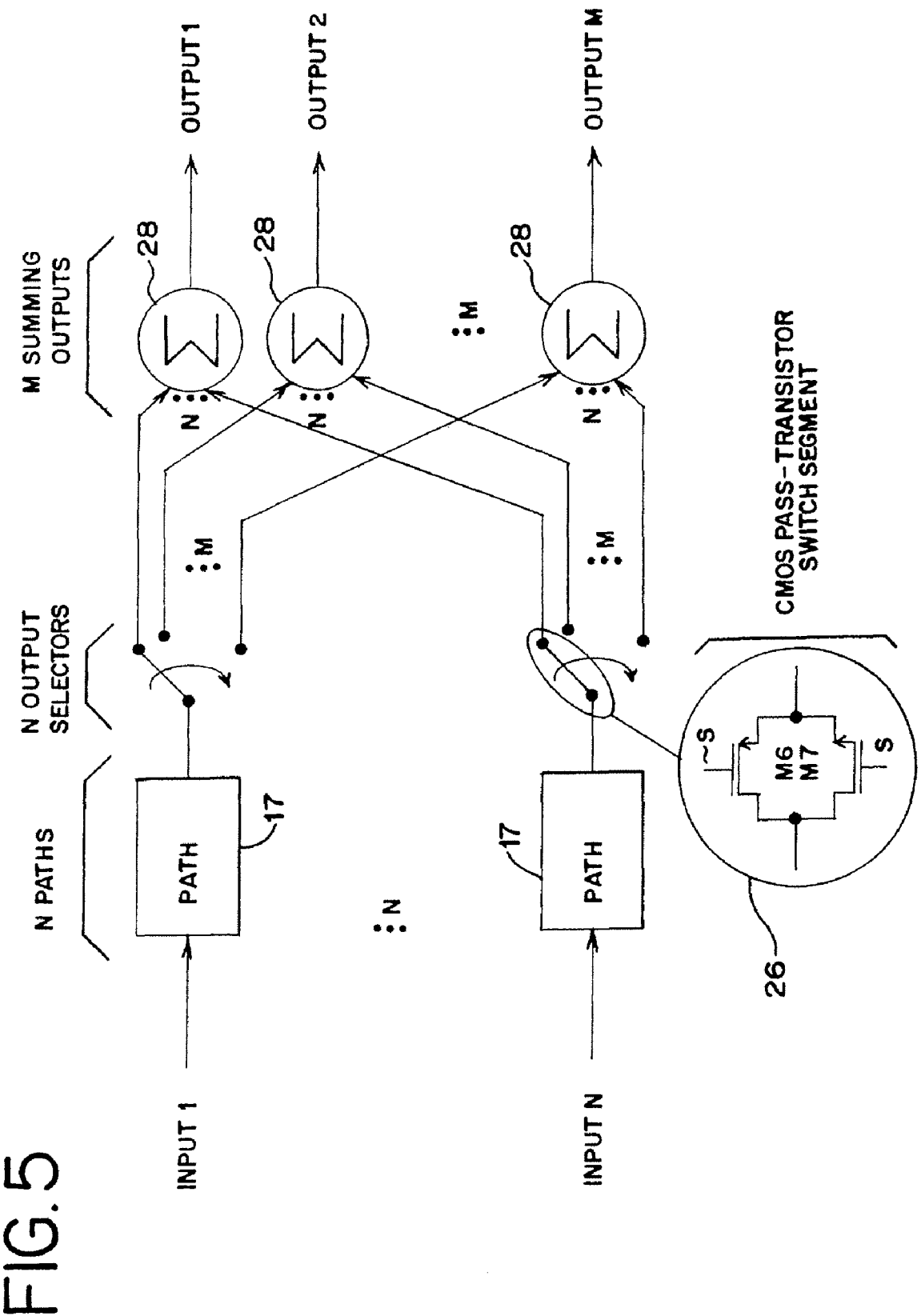
FIG. 5 is a block diagram of one embodiment of a switching network for connecting different receive channels with different summers.

For flexibility, a switch network connects the path 17 to the plurality of summers 28. FIG. 5 shows one embodiment of a circuit with a plurality of paths 17 connectable to a plurality of summers 28 with a switch network 26. The switch network 26 is operable to selectively connect each of the paths 17 to different summers 28. In one embodiment, the switches 26 comprise two CMOS transistors switch segments as shown in FIG. 5. Alternatively, a single transistor, different types of transistors, different types of switches, a multiplexer or other devices now known or later developed are used for selectively connecting different paths 17 to different summers 28. In the embodiment shown in FIG. 5, a switch segment comprising a pair of transistors is provided for each possible connection of a given path 17 to a plurality of summers 28. For example, a given path 17 may be selectively connected with M summers 28. A pair of transistors is provided for each possible connection from the path 17 to each of the M summers 28. At least one transistor switch is provided for each possible combination of each of the paths 17 to each of the plurality of summers 28. In alternative embodiments, a given path 17 is only connectable with a subset or fewer than all of the summers 28. Using the switch network 26, different paths 17 may be connected with different summers 28. Accordingly, different sub-apertures are formed for output by different summers 28. By connecting different groups of the plurality of elements 12 and the associated paths 17 into respective sub-apertures, each summer 28 outputs the sub-aperture signal.

In one embodiment, the number of summers 28 and associated outputs corresponds to the number of available cables 20 connecting the transducer array to the imaging system and/or the number of receive beamformer channels in the diagnostic medical imaging system. The number of paths 17 corresponds to the number of active elements 12 of the array. When the number of active elements 12 of the array is greater than the number of outputs or summers 28, a subarray compression factor is given by the ratio of the number of active elements 12 by the number of available outputs. The compression factor may range from about 1 to 20 or more. For example, a subarray compression factor of 4 to 16 is provided for real time three dimensional imaging with a two dimensional transducer array of 2048 element using 128 to 512 cables or receive beamformer channels. The number of switches 26 provided for each path 17 is equal to or less than the number of summers 28 and associated system or cable channels. Any of various subarray signals may be formed for output on the available channels.

Figure 6:
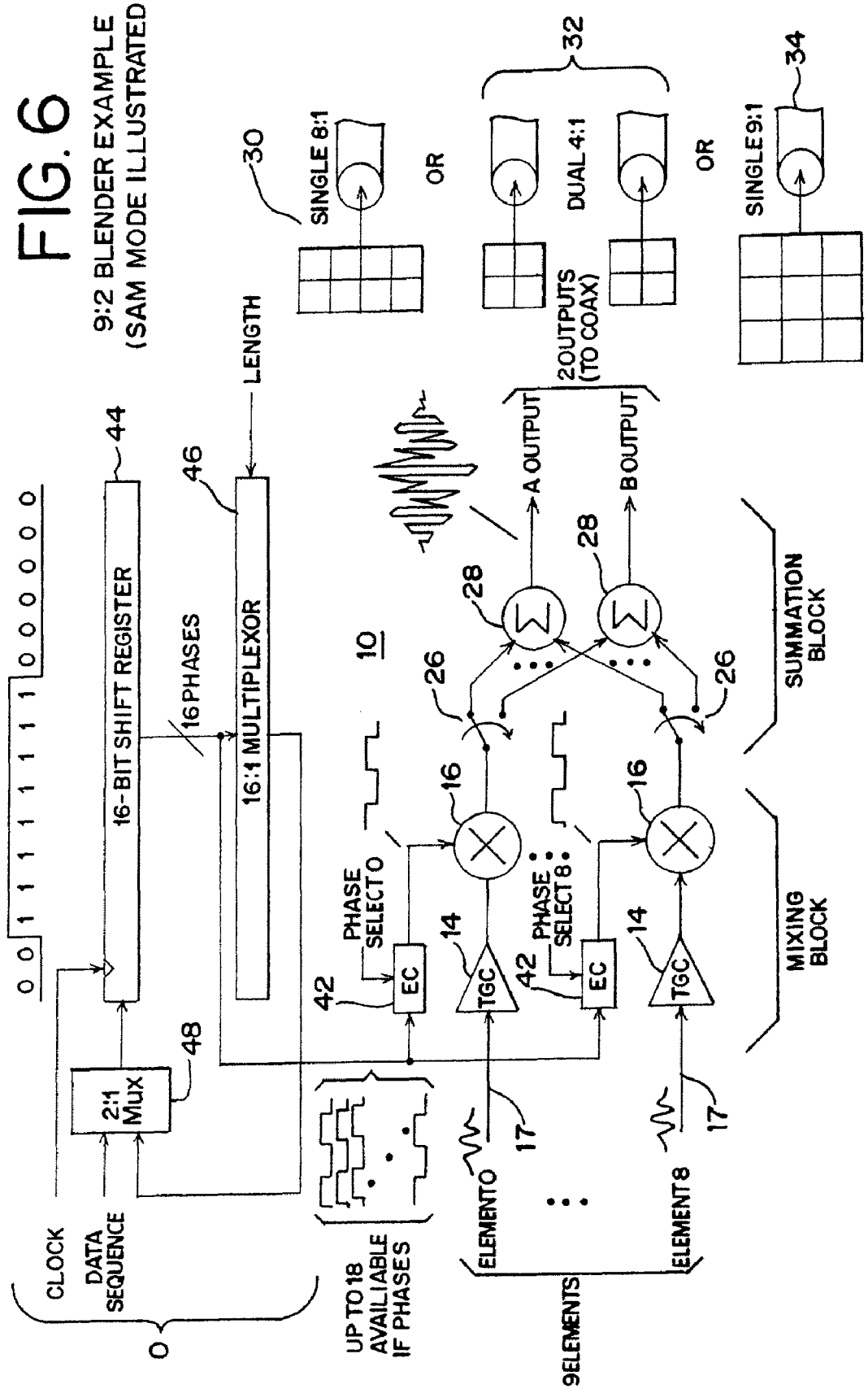
FIG. 6 is a block diagram of one embodiment of a control circuit and associated receive circuits operating in a subarray mixed mode.

FIG. 6 shows use of the circuit of FIG. 5 for subarray mixing. In the embodiment shown in FIG. 6, nine different elements 12 and associated paths 17 are combined in two sub-apertures on two different outputs associated with two summers 28. Using the switch network 26, different ones of the path 17 are mapped to different outputs or summers 28. For example, 8 of the elements are mapped to a single summer 28 as represented at 30. As represented at 32, two different sub-apertures of four elements each are mapped to the two outputs or two summers 28. As shown at 34, nine different elements are mapped to a single output and associated summer 28. Other combinations of sub-apertures of one or more elements may be mapped to one or more of the outputs. In one embodiment, each element and associated path 17 is mapped to a single summer 28. In alternative embodiments, a path 17 is mapped to more than one summer 28. Using the flexibility, the same circuit 10 is usable with an ultrasound imaging system with a different numbers of channels. For example, 9 to 1 mapping is used for a low channel count system (e.g., 128 receive beamformer channels) and 4 to 1 mapping is used for a system with a high channel count (e.g., about 300 receive beamformer channels) given about 1,600 elements. In some modes, such as represented at 30 and 32, one input or path 17 is unused out of the group of nine paths 17. Additional unused paths 17 may be provided. For powering down, the current sources M2 and M3 of FIG. 4 are deactivated. The circuit is powered down to avoid power dissipation by unused channels. Alternatively, all of the elements are mapped to different sub-apertures.

FIG. 6 also includes a controller 40 connected with each of the paths 17 through element controllers 42. Each of the element controllers 42 is responsive to an input for selecting a mode of operation, such as selecting between subarray mixing and time division multiplexing. Alternatively, the output of the shift register 44 indicates the mode of operation. The shift register 44 stores a switching kernel, such as the series of zeroes and ones shown above the shift register 44. For subarray mixing, the switching kernel is a square wave defined by ones and zeroes of a desired length. For example, the kernel shown in FIG. 6 has a 50 percent duty cycle square wave of eight ones in sequence with eight zeroes. Different duty cycles, different waveforms, and lesser lengths may be used, such as two ones followed by two zeroes followed by two ones and so on. Each shift register bit represents a unique phase of a local oscillator used to modulate the input signals into the path 17. Each of the element controllers 42 selects an appropriate local oscillator phase and routes the phasing to the path 17. Different phases are selected for different paths 17. For example, the first path for element zero is associated with the phase defined by the first bit. The ninth path for element 8 is associated with the ninth bit of the kernel. Different phasing relationships may be used. The multiplexers 46 and 48 allow the length of the switching kernel to be varied by up to 16 bits in this embodiment. By multiplexing different outputs from the shift register 44 into an input of the shift register 44, a different length may be provided for the switching kernel for a different oscillation frequency. The additional multiplexer 48 also allows a new length or kernel independent of the previous kernel to be fed into the shift register 44. For time division multiplexing operation, the kernel consists of a single one value. As the one cycles through the shift register, individual elements 12 in the associated path 17 are enabled to place their input on an output in a non-overlapping time division multiplexed fashion. In alternative embodiments, a pair of ones are used for identifying a longer time slot for each element. A longer time slot may be used in other embodiments.

In one embodiment, the transducer array of elements 12, associated paths 17, switching network 26, summers 28 and controller 40 are implemented in a releasable transducer assembly. For example, a hand-held probe housing houses an application specific integrated circuit implementing the receive circuit 10. Alternatively, one or more of the components are located within a connector housing that is also part of the releasable transducer assembly. The releasable transducer assembly is releasably attachable to an ultrasound imaging system. As a result, any of various transducer arrays may be used with different ultrasound systems even where the ultrasound system has a fewer number of receive beamformer channels than number of elements provided by the array. Other electronics may be included within the transducer probe housing or within the transducer assembly connectable with the ultrasound imaging system. For example, the controller 40 or at least a portion of the controller is within the transducer probe housing. Alternatively, the controller 40 is within the ultrasound imaging system and provides signals along one or more control lines to electronics within the transducer assembly or transducer probe housing. In alternative embodiments, a part or all of the receive circuit 10 is located within the imaging system and is not detachable.

Figure 7:
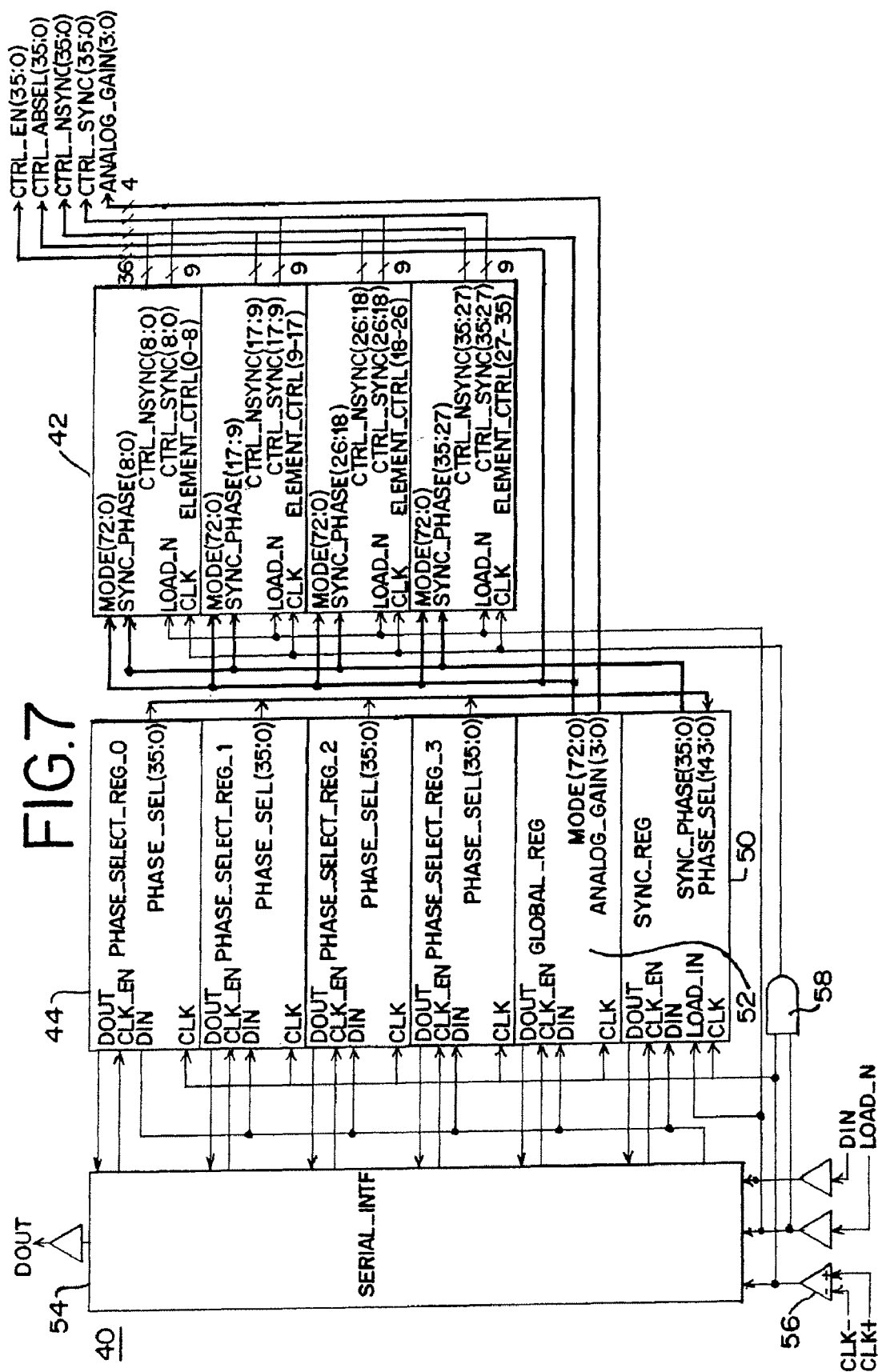
FIG. 7 is a control circuit of one embodiment operable with the receive circuit of FIG. 2.

The controller 40 connects with a plurality of the paths 17. As shown in FIGS. 6 and 7, the controller 40 is modular and includes a plurality of registers 44 for different groups of the plurality of paths 17. For example, a phase selection register 44 is provided for every group of nine elements 12. Other numbers of elements 12 for each register 44 may be used. Each of the registers 44, element controls 42, global register 52 and/or sync register 50 is a control module for the groups of elements 12. Each of these control modules is operable to output control signals, such as the registers 44 outputting a phase selection for each of a plurality of mixing circuits.

As shown in FIG. 7, a clock source 56 connects with each of the registers 44. This clock source 56 comprises a local oscillator, an input clock signal from a remote source or any other now known or later developed clock signal. In one embodiment, the input clock signals comprise differential or positive and negative indications. Alternatively, the clock source is a single input line. The clock source 56 connects with a serial interface 54, the registers 44, a global register 52, and a sync register 50 of the controller 40. A load indication signal also connects with the serial interface 54 and a AND gate 58. The other input to the AND gate 58 is the clock signal. The AND gate 58 outputs the clock signal to the element controllers 42 when the load signal is high. A high load signal indicates an ongoing use or operation of the receive circuit 10. A low load signal indicates loading of parameters into the various registers 44 of the controller 40, so the clock signal is disabled to the element controllers 42 to minimize power consumption.

Either the AND gate 58, the serial interface 54, and/or gates within any register or controller act as a clock enable controller. The clock enable controller connects with a plurality of control modules, such as the registers 44 or the element controllers 42. The clock enable controller is operable to prevent clocking of at least one of the plurality of control modules, such as the clock signal gating by the AND gate 58 as described above for the element controllers 42. The registers 44 are also or alternatively controlled by a clock enable controller, such as the serial interface 54. The serial interface 54 provides access to the programmable control modules as a serial bus slave device. The serial bus master which controls the serial interface 54 is an application specific integrated circuit or field programmable gate array. The serial interface protocol uses a three stage transaction configuration having a start/reset stage, an address stage and a data stage, but other protocols may be used. The clock source 56 is input to the serial interface 54 as well as the load signal and a serial data input. The serial data input and output allow daisy chaining of multiple digital control networks 40. For diagnostic purposes, a register read back may be supported by connecting the serial data output to the serial bus master controlling the clock and load line signals.

The phase select registers 44 are control modules that store phase information for individual elements. The phase information is used for subarray mixing modes of operation. For nine elements, each phase select register stores a four bit phase selection. A maximum of 16 available synchronous pulse phases are provided. In other embodiments, a fewer or greater number of bits are used. For one controller 40, four phase select registers 44 are provided, allowing control of 36 elements. In other embodiments, fewer or more than four phase select registers 44 are used. During time division multiplexing operating mode, the registers 44 are loaded once every mode change but remains static from beam to beam or during a scan of the region. For subarray mixing operating modes, the registers 44 are loaded for every scan lines or steering change.

To save power, such as where the controller 40 is within a detachable transducer assembly, the clock signal to the phase select registers 44 is gated by the serial interface 54. The clock is enabled or turned on to load and read-out the kernel or phase selection information prior to use by the receiver circuit 40. The phase select registers 44 are then disabled or inactive during use by the receive circuit 10. When the phase select registers 44 are off, data is output but at a static value or values. The static information is used for control or phase selection without power dissipation due to clocking. The serial interface 54 acts as a clock enable control operable to enable a clock signal into each of a plurality of registers 44 for loading data and disable the clock into each of the plurality of registers 44 during the readout operations.

An additional global register 52 is provided in one embodiment. The global register stores static control parameters for all of the elements. For example, the register includes 77 bits. The bits define four types of parameters, such as an analog gain control (e.g., four bits), operating mode (e.g., one bit for identifying multiplexing or sub-array mixing), element specific output or summer selections (e.g., 36 bits defining the connections of each of nine channels 17 to two possible summers 28) and element enable selections (e.g. 36 bits defining which elements are enabled and disabled). The analog gain control is the same for all elements, such as a value for establishing the bias point of transistors M2 and M3 in FIG. 3. The operating mode also applies globally to all elements. Other control structures, numbers of bits, purposes for the bits, or coding may be used in other embodiments. For example, additional global control bits can be used to provide a means of calibrating channels within one ASIC to match those in another ASIC or group of ASICs.

Figure 8:
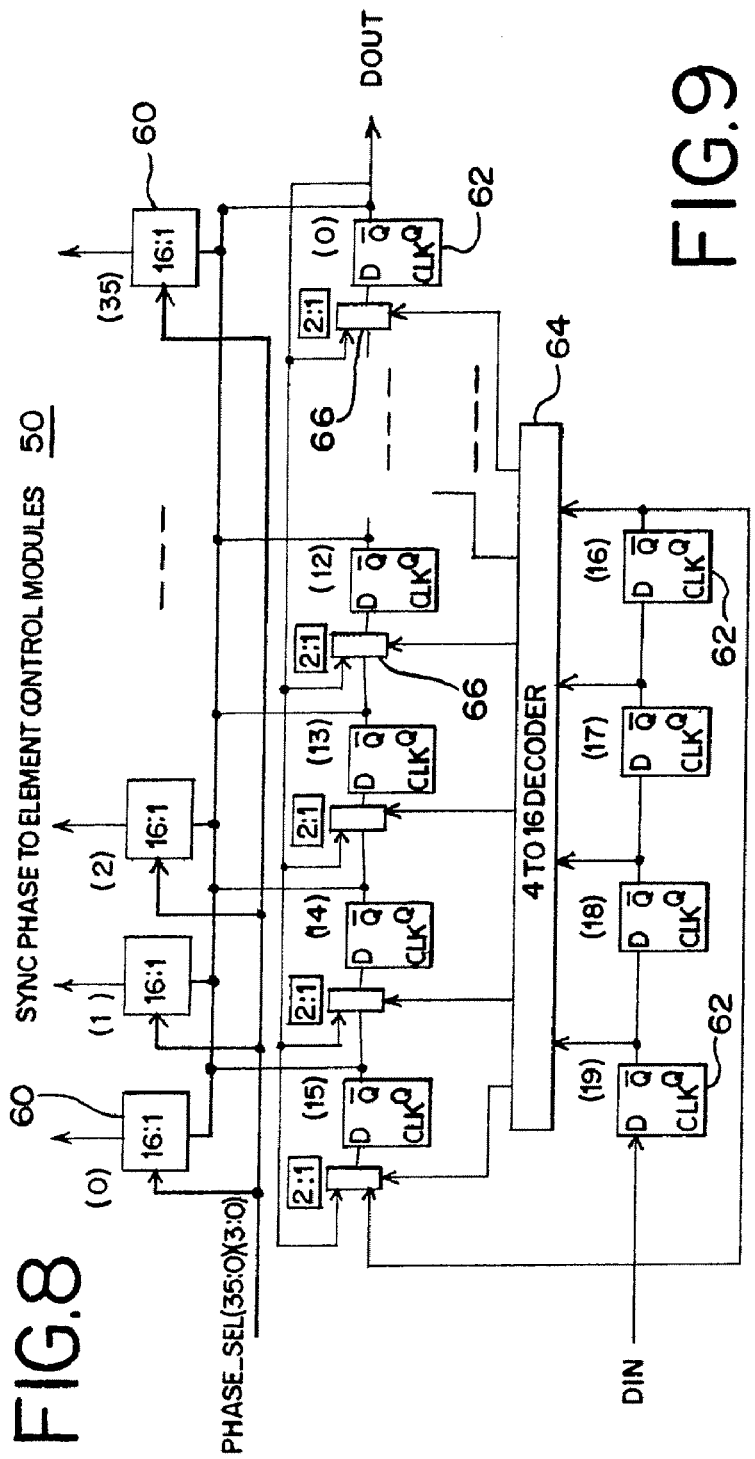
FIG. 8 is a circuit diagram of one embodiment of a synchronization register of FIG. 7.

The synchronization register 50 is a programmable local oscillator for providing the local oscillation control signal to the component 16. The synchronization register 50 generates a programmable multiphase waveform. In one embodiment, the register 50 also includes an array of 36 phase multiplexers which select one phase of the local oscillation signal to be applied to each element 12 for the controller 40. In one embodiment described above, the synchronization register 50 outputs a 16 bit synchronization pattern in a loop register with a four bit feedback path select. FIG. 8 shows one embodiment of the synchronization register 50. The phase multiplexers for each of the elements are shown at 60. Twenty flip flops 62 are provided for initial storage of a kernel for the local oscillator signal. During operation, the flip flops 62 labeled 16 through 19 are static, but the flip flops 0 through 15 are active allowing shifting in of new bits under the control from the decoder 64. The flip flops 62 labeled 0 through 15 are set up in a variable length, circular shift register. The length of the shift register is one register more than the value stored in the flip flops 62 labeled 16 through 19. For example, implementing the sub-array mixing mode of length 16, a same number of zeroes and ones are provided in the flip flops 62 labeled 0 through 15. The flip flops 62 labeled 16 through 19 using the decoder 64 control the multiplexers 66 to select a bit for shifting, and set the frequency. For time division multiplexing nine inputs onto one output, one high value is stored with the remaining flip flops 62 having low values. The flip flops 62 labeled 16 through 19 through the decoder 64 cause the flip flops 62 labeled 0 through 8 to loop in a repeating cycle. One synchronization register is shown above, but different synchronization registers may be used. In yet other alternative embodiments, structures other than a register may be provided for outputting phase, local oscillation waveforms and/or time slot information.

Figure 9:
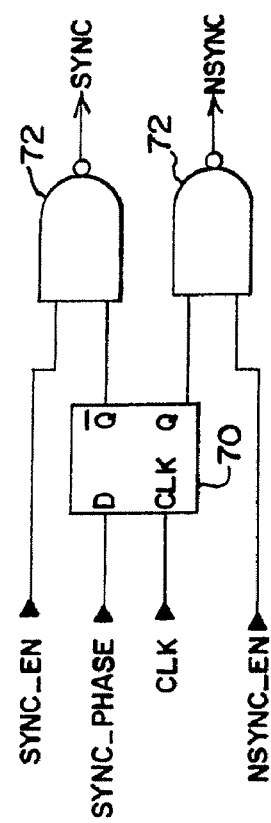
FIG. 9 is a circuit diagram of an element control of FIG. 7.

The element controls 42 shown in FIG. 7 are digital or analog devices for outputting signals controlling the component 16, such as switch operation control signals. FIG. 9 shows one embodiment of the element control modules 42. The element control module 42 of FIG. 9 shows structure for a single element 12 or path 17. As shown in FIG. 7, each module 42 is associated with nine paths 17, but another number of paths, such as less than 9 or more than 9 may be controlled by each module. The structure for each path 17 is separate or independent of other paths 17 controlled by the same module 42. For any given path 17, the element control module 42 includes a flip flop 70 and two NAND gates 72. Additional, different or fewer components may be provided. This element control module 42 is operable to output a control signal that varies as a function of selected mode of operation. For example, the phase information for a particular path 17 is input as the synchronous phase from the sync register 50. A clock signal is also input to the flip flop 70. As discussed above, the clock signal is enabled or disabled by the AND gate 58. The synchronous enable and N synchronous enable input lines are derived from the mode selection and element enable from the global register 52. If a particular element 12 and associated path 17 is not enabled, both the synchronous enable and the N synchronous enable are maintained as low values, resulting in a high output for both the synchronous and the N synchronous signals. For operation in the time division multiplexing mode, only one of the synchronous enable or N synchronous enable values is set as high. For example, the synchronous enable is set as high and the N synchronous enable signal is set as low. As a result, the synchronous output varies as a function of the output of the flip flop 70. The N synchronous output from the NAND gate 72 is held high. When a desired time slot for a particular path 17 is input on the synchronous phase line to the flip flop 70, the NAND gate 72 changes from a high to a low value. In the subarray mixing mode of operation, both the sync enable and N sync enable are held high. The synchronous phase information provided to the flip flop 70 is clocked through the flip flop to both NAND gates 72. As a result, the output of the synchronous and N synchronous signals provide the "1" and "−1" values of the local oscillation at a selected phase. The synchronous and N synchronous outputs are complements.

Using the receive circuitry 10 described above or different receive circuitry, a method is provided for ultrasound sub-aperture processing. Using the control circuits 40 described above or different control circuits, a method for controlling the sub-aperture operation in an ultrasound transducer is provided.

One of at least two different sub-aperture processes are selected for each of a plurality of channels. For example, either mixing or multiplexing are selected. The same sub-aperture process is selected for each channel, but different sub-aperture processes may be selected for different sub-apertures. The selection is performed in response to a type of imaging, an imaging application, a type of imaging system, the number of receive beamformer channels, the desired resolution, or other user input or processor determination.

In response to the selection of mixing, an associated phase for each of the channels or paths is determined. For example, a lookup table is used to identify phases for different elements of each sub-aperture as a function of the steering direction. The same or different phase may be used for any two elements within an aperture. For time division multiplexing, a time slot associated with each element and associated channel is identified from a lookup table or calculation. Each channel within a sub-aperture has a different time slot designation. Each channel within a sub-aperture is configured pursuant to the desired sub-aperture processing mode, such as for other types of multiplexing or other sub-aperture processes. In one embodiment, the sub-aperture is used for a combination of mixing and multiplexing different mixed combinations.

The specific sub-apertures are also identified. For example, the number of sub-apertures desired is determined as a function of the number of receive beamformer channels of the imaging system for subarray mixing. The number of cables may be used to determine the number of sub-apertures for time division multiplexing. Other factors may be used for identifying the number and position of sub-apertures in any mode. Using a lookup table or other data source, a number of enabled elements is determined. For example, all of the elements of a multi-dimensional transducer array are enabled. The sub-apertures are then defined within the enabled elements. The size of each sub-aperture depends upon the number of available sub-apertures and the number of elements enabled. In one embodiment, each sub-aperture is associated with a same size multi-dimensional area as other sub-apertures. Each multidimensional sub-aperture is contiguous. In alternative embodiments, the sub-apertures are non-contiguous or contiguous but linear. Any possible sub-aperture shapes may be used. The sub-apertures used may vary as a function of the scan line being scanned, as a function of a depth of the focus, as a function of each scanned frame of data, as a function of an imaging session or as a function of other imaging parameters. The sub-apertures are defined by configuring the elements and associated channels to connect with different summers. The possible sub-apertures may be limited by the receive circuits 10, such as every group of nine elements being configuration in any pattern of up to two sub-apertures.

After configuring the receive circuitry, signals responsive to the configuration and selections discussed above are output to each of the channels during use. For subarray mixing, a local oscillation signal with a selected phase is output to each of the channels. Different channels may have different phases. For time division multiplexing, a time slot pulse is output for each of the channels in the sub-aperture. A different time slot is identified for each of the channels. The time slot pulse activates a particular channel for a desired time slot.

In response to the output signals, a component in each receive paths is controlled based on the selection of mode of operation. The same component is controlled differently or operates differently as a function of the mode of operation of sub-aperture processing. The same component performs a different function. For example, two pairs of switches are controlled differently depending on the mode of sub-aperture processing. A pair of switches are continuously operated in an inverse fashion with one pair on and the other pair off at a mixing frequency, modulating the input signal using the switches in response to a local oscillation signal. In a different mode of operation, such as time division multiplexing, the switches are switched in the receive channel to output the input signal only at desired time slots. At times other than the identified time slot, the switches remain in an off position.

Based on the sub-aperture configuration, input ultrasound signals responsive to the mode of operation and control of components in the plurality of receive channels are combined for the sub-aperture. The signals of one channel are combined with signals from other receive channels in the same sub-aperture. For subarray mixing, the modulated input signals are summed with signals from other receive channels. The combined subarray mixed signals represent partially beam-formed information. For time division multiplexing, the signal from one channel is output in one time slot and signals from other channels are output in other time slots. The combined output is a time division multiplex signal for the sub-aperture. By selecting different sub-apertures, the signals from different groups of elements are routed to a respective output for each sub-aperture.

The control of the different paths pursuant to the different modes of sub-aperture operation is performed with a plurality of control modules in one embodiment. Each control module corresponds to a different group of elements. In one embodiment, each control module is operable to configure the corresponding group of elements into for one or two sub-apertures. In other embodiments, the control modules connect in such a way that a sub-aperture includes elements associated with different control modules. In yet other alternative embodiments, a single control module controls all of the elements.

To save power, a clock signal to one or more of the control modules may be disabled during operation. Once the desired data is loaded within a register or other source of static information, the clock is disabled to avoid unnecessary power consumption. For hand-held imaging systems, portable imaging systems or multi-dimensional transducer arrays with a limited amount of space and power availability, reductions in power consumption may allow for more efficient operation.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for variable sub-array combinations in ultrasound, the system comprising:
a plurality of elements;
a plurality of summers, each of the summers operable to output a sub-array signal that is a sum of the elements in a corresponding sub-array and not a function of the elements not in the corresponding sub-array; and
a switch network connected between the plurality of elements and the plurality of summers in a plurality of paths, the switch network operable to selectively connect each of the elements to any of the plurality of summers such that any of the elements are configurable by the switch network to be in any of the sub-arrays.

2. The system of claim 1 further comprising:
a releasable transducer assembly housing the plurality of elements, plurality of summers and the switch network, the plurality of elements being part of a multi-dimensional transducer array, each of the plurality of summers outputting a sub-aperture signal.

3. The system of claim 1 wherein the switch network comprises at least one transistor switch for each possible combination of each of the plurality of elements to each of the plurality of summers.

4. The system of claim 1 wherein the switch network is operable to connect different groups of the plurality of elements into respective sub-apertures corresponding to the respective sub-arrays, each sub-aperture associated with one of the plurality of summers.

5. The system of claim 1 further comprising:
a mode responsive switch connected between each element and the switch network, the mode responsive switch operable to perform one of: (i) modulate signals from the respective element with a local oscillating signal and (ii) select a time slot for multiplexing in response to a control signal.

6. The system of claim 5 wherein the mode responsive switch comprises a plurality of mode switches configurable with a first combination of switch connections operable for performing the modulation and with a second combination of switch connections operable for performing the selection.

7. The system of claim 6 wherein the mode switches comprise four switches, first and third switches connectable with a first input, second and fourth switches connectable with a second input, the second input being an inverse of the first input, the first and fourth switches connectable with a first output and the second and third switches connectable with a second output.

8. The system of claim 7 wherein the first and second switches are controllable in unison and the third and fourth switches are controllable in unison, the modulation corresponding to switching between (i) opening the third and fourth switches while closing the first and second switches and (ii) vice versa, the selection corresponding to switching between (i) opening the third and fourth switches while closing the first and second switches and (ii) closing the first, second, third and fourth switches.

9. The system of claim 5 wherein a single ended input amplifier having differential outputs connects with the mode responsive switch and a differential input amplifier with a single ended output connects with the mode responsive switch.

10. The system of claim 9 wherein the single ended input amplifier comprises a variable gain amplifier with a common mode feedback.

11. The system of claim 5 wherein the mode responsive switch is operable to open and close corresponding to the local oscillator signal for the modulation and operable to open and close corresponding to the selected time slot for the selection.

12. The system of claim 1 further comprising:
a controller comprising a plurality of registers for different groups of the plurality of paths and comprising a clock enable control operable to enable a clock into each of the plurality of registers for loading or reading out data and disable the clock into each of the plurality of registers when not loading or reading out data.

13. The system of claim 12 further comprising:
a clock source connected with each of the plurality of registers; and
a clock enabled controller connected with each of the plurality of registers, the clock enable controller operable to prevent clocking of at least one of the plurality of registers.

14. The system of claim 13 wherein the clock enable controller is operable to enable clocking for loading the plurality of registers and disable clocking during operation of a controlled receive circuit.

15. The system of claim 13 wherein the clock enable controller comprises a serial interface.

16. The system of claim 12 wherein the registers are operable to output a phase selection for each of a plurality of mixing circuits; and further comprising:
an element control operable to output a control signal that varies as a function of a selected one of at least two modes of operation.

17. The system of claim 12 further comprising:
a transducer probe housing connectable with an ultrasound imaging system;
wherein the controller is within the transducer probe housing.

18. The system of claim 1 further comprising within each of the paths:
a bipolar differential amplifier;
a current source connected with the bipolar differential amplifier, the current source operable to provide variable gain; and
a common mode feedback path to the current source from the bipolar differential amplifier.

19. The system of claim 18 wherein the bipolar differential amplifier comprises first and second transistors, wherein the current source comprises a third transistor and wherein the common mode feedback path comprises a transconductor connected with a mirror transistor of the third transistor.

* * * * *